Figure 1:
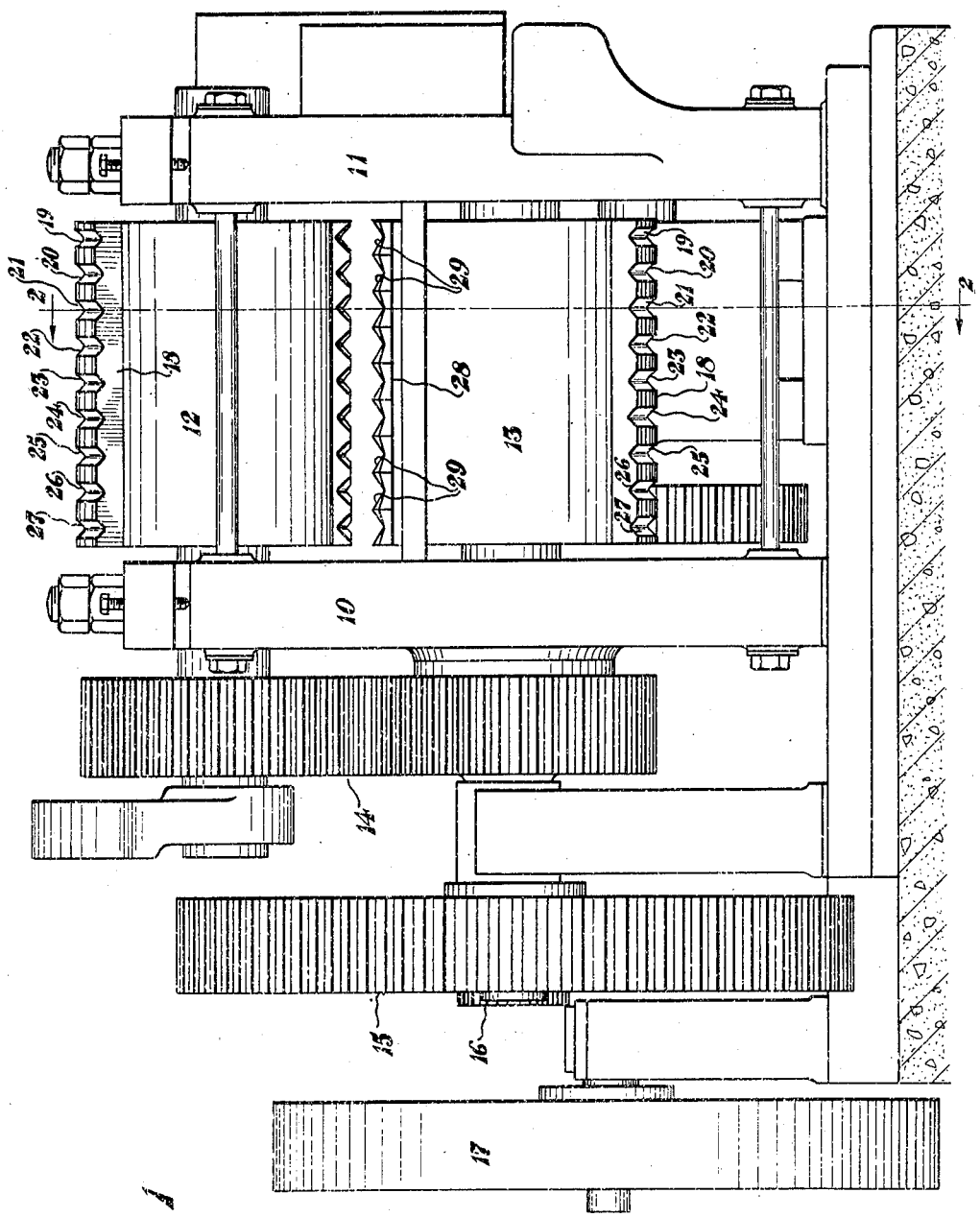

Feb. 3, 1931.  C. A. BRAUCHLER  1,791,187
METHOD OF FORGING
Filed April 5, 1929   5 Sheets-Sheet 1

Inventor
C. A. Brauchler
By Harry Frease Attorney

Feb. 3, 1931.  C. A. BRAUCHLER  1,791,187
METHOD OF FORGING
Filed April 5, 1929   5 Sheets-Sheet 2
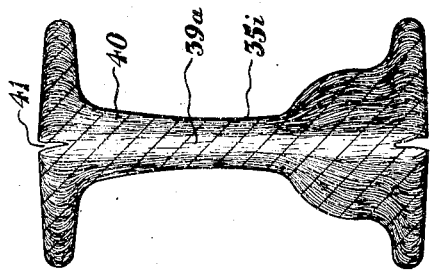
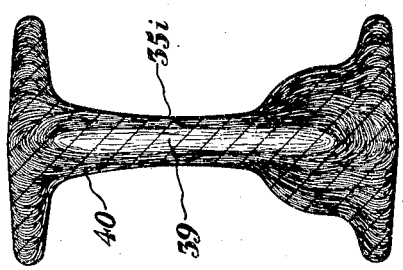
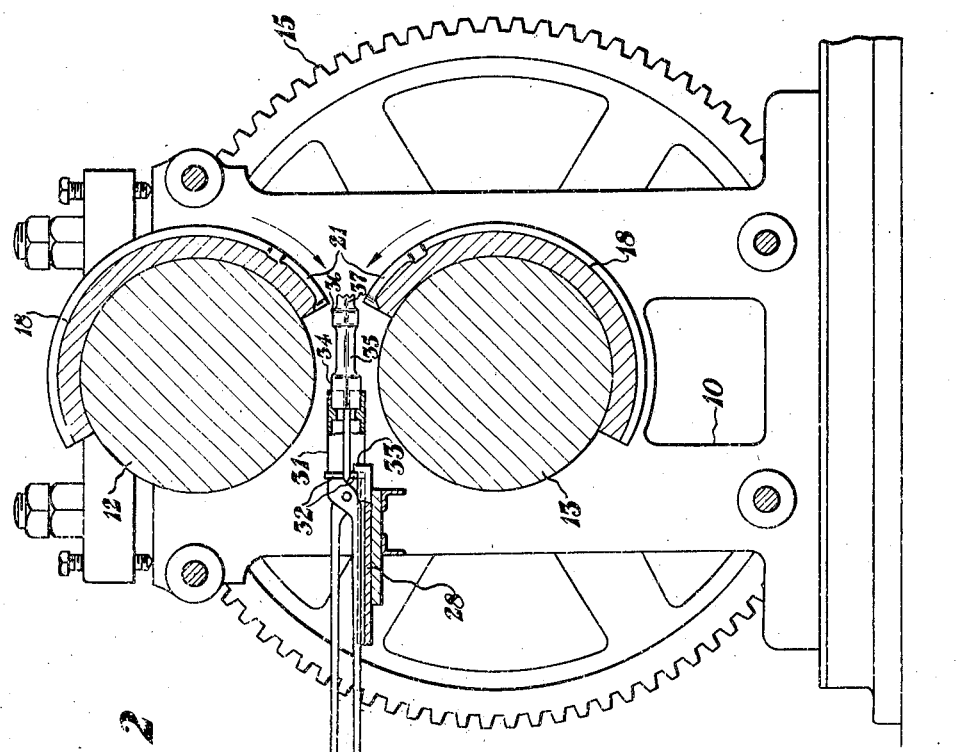

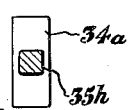
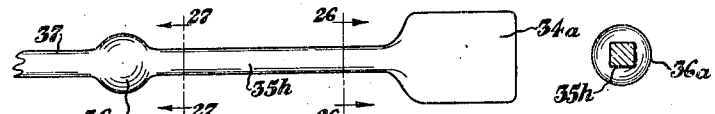
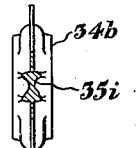
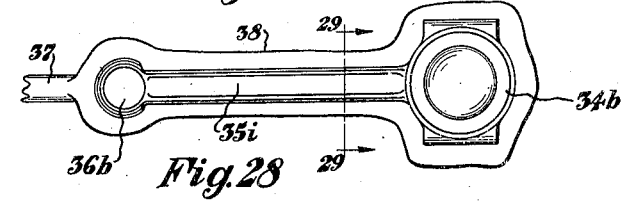
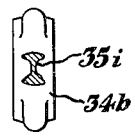
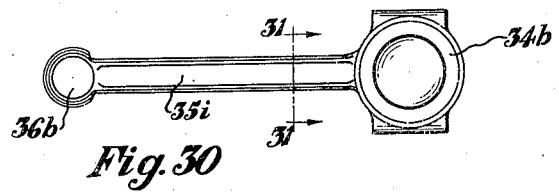
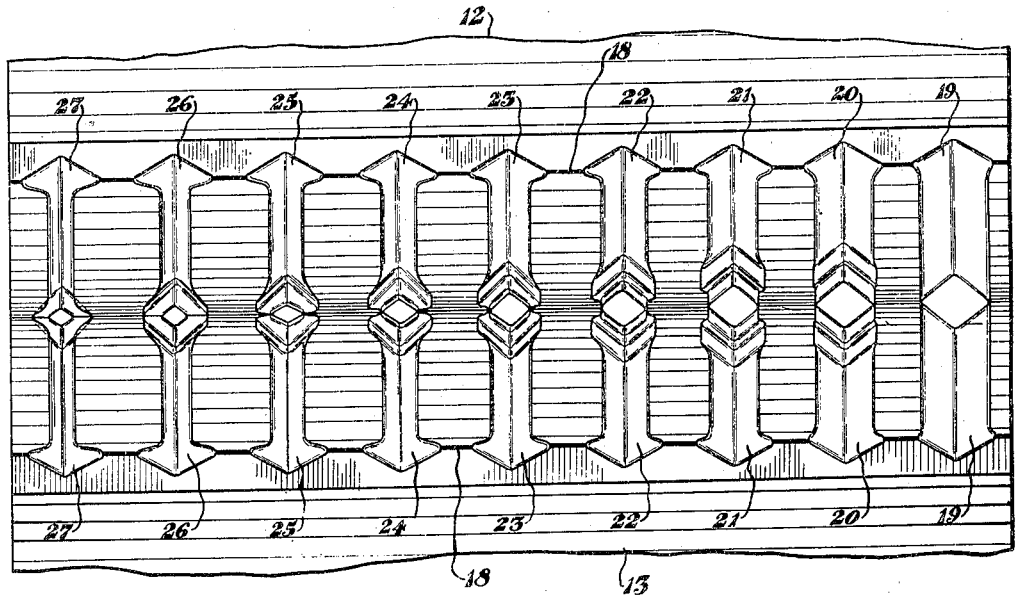

Feb. 3, 1931.     C. A. BRAUCHLER     1,791,187
METHOD OF FORGING
Filed April 5, 1929     5 Sheets-Sheet 4

Inventor
C. A. Brauchler
By Harry Frease
Attorney

Feb. 3, 1931.   C. A. BRAUCHLER   1,791,187
METHOD OF FORGING
Filed April 5, 1929   5 Sheets-Sheet 5

Inventor
C. A. Brauchler
By Harry Frease
Attorney

Patented Feb. 3, 1931

1,791,187

UNITED STATES PATENT OFFICE

CHARLES A. BRAUCHLER, OF CANTON, OHIO

METHOD OF FORGING

Application filed April 5, 1929. Serial No. 352,726.

The invention relates to the forging of articles such as connecting rods for automobile engines, and more particularly to a method which produces a straight grain flow longitudinally of the forged article and uniform molecular structure throughout the section thereof.

In the method of elongating articles of this character by hammer forging, which is now in general use, a spongy central lamination is produced in the forged article, extending longitudinally thereof, and causing frequent splits on one or both sides of the article where the spongy lamination extends through to the outer sides thereof.

The reason for this condition in the forged article is that a straight grain flow cannot be maintained by elongating the article by hammering. This elongation is commonly produced by taking bites at different points upon the bar blank, these bites considerably distorting the grain flow and producing whirls extending more or less transversely of the article.

The blank cannot be accurately sized with this old manner of hammer elongation and thus a considerable amount of flash or fin is produced with the final die hammering operation, the distortion of the grain flow being increased and the spongy central portion extending through the outside of the finished forging at many points.

It will be seen that when the flash or fin is trimmed off the distorted or whirling cords of the grain will be severed in many places, thus materially weakening the finished forging.

The object of the present improvement is to provide a method of forging by which the spongy core is compressed within the central portion of the forging, being entirely enclosed therein, so that there is no splitting at the sides.

A straight longitudinal grain flow and uniform molecular structure is produced throughout the section even when it is afterwards hammer forged to an I section.

The above and other objects may be attained by elongating a bar blank by means of rolls provided with suitable dies, the blank being given a quarter turn after each pass through the rolls in order to compress the spongy core within the center of the bar.

After the bar has been sufficiently elongated, it may be hammer forged to the finished shape retaining the spongy core confined to the center thereof.

Figure 4:
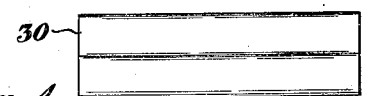
Figure 5:
Figure 6:
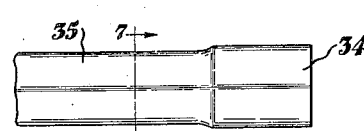
Figure 7:
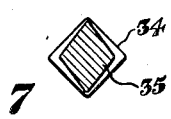
Figure 8:
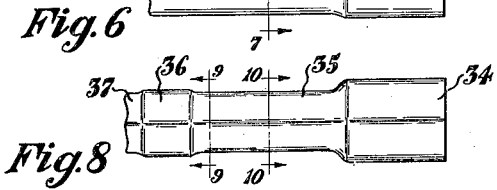
Figure 9:
Figure 10:
Figure 11:
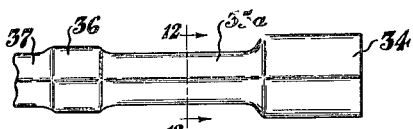
Figure 12:
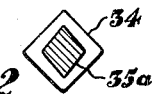
Figure 13:
Figure 14:
Figure 15:
Figure 16:
Figure 17:
Figure 18:
Figure 19:
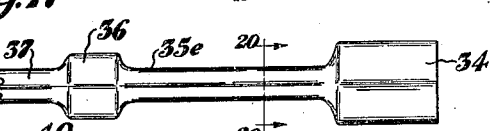
Figure 20:
Figure 21:
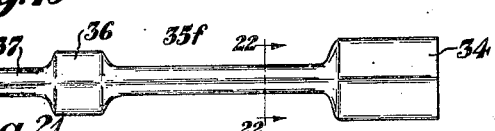
Figure 22:
Figure 23:
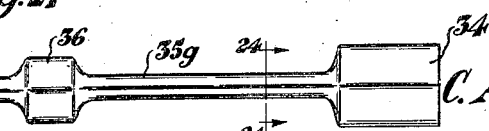
Figure 24:
Figure 34:
Figure 35:
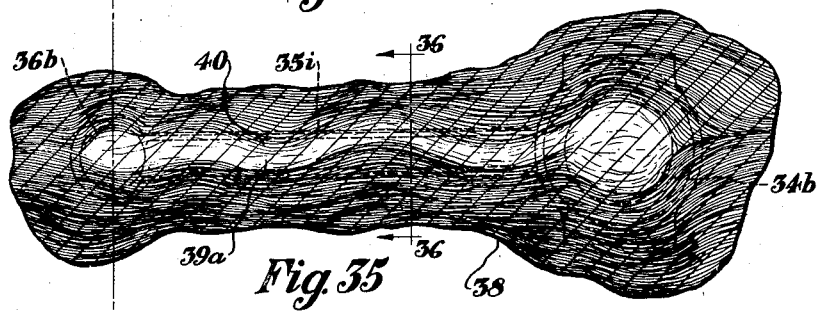
Figure 37:
Figure 38:
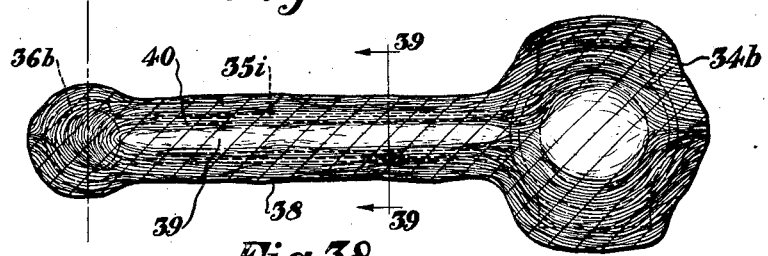
Figure 36:
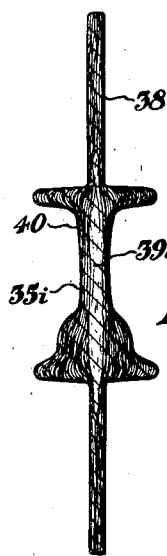
Figure 39:
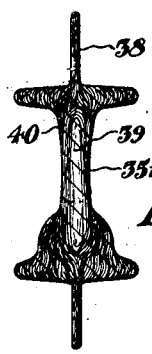

An embodiment of the invention is illustrated in the accompanying drawings, in which Figure 1 is a front elevation of a forging mill designed to accomplish the roll forging forming a part of the process;

Fig. 2, a section on the line 2—2, Fig. 1;

Fig. 3, an enlarged view of the roll dies used in the forging mill;

Fig. 4, a side elevation of the blank bar from which the forging is made;

Fig. 5, an end elevation of the same;

Fig. 6, a side elevation of the bar after the first rolling operation;

Fig. 7, a section on the line 7—7, Fig. 6;

Fig. 8, a side elevation of the bar after the second rolling operation;

Fig. 9, a section on the line 9—9, Fig. 8;

Fig. 10, a section on the line 10—10, Fig. 8;

Fig. 11, a side elevation of the bar after the third rolling operation;

Fig. 12, a section on the line 12—12, Fig. 11;

Fig. 13, a side elevation of the bar after the fourth rolling operation;

Fig. 14, a section on the line 14—14, Fig. 13;

Fig. 15, a side elevation of the bar after the fifth rolling operation;

Fig. 16, a section on the line 16—16, Fig. 15;

Fig. 17, a side elevation of the bar after the sixth rolling operation;

Fig. 18, a section on the line 18—18, Fig. 17;

Fig. 19, a side elevation of the bar after the seventh rolling operation;

Fig. 20, a section on the line 20—20, Fig. 19;

Fig. 21, a side elevation of the bar after the eighth rolling operation;

Fig. 22, a section on the line 22—22, Fig. 21;

Fig. 23, a side elevation of the bar after the ninth and final rolling operation;

Fig. 24, a section on the line 24—24, Fig. 23;

Fig. 25, a side elevation of the bar after the first hammering operation;

Fig. 26, a section on the line 26—26, Fig. 25;

Fig. 27, a section on the line 27—27, Fig. 25;

Fig. 28, an elevation of the forged connecting rod before the flash or fin has been trimmed therefrom;

Fig. 29, a section on the line 29—29, Fig. 28;

Fig. 30, an elevation of the finished connecting rod forging;

Fig. 31, a section on the line 31—31, Fig. 30;

Fig. 32, an enlarged section through the I-beam portion of the connecting rod showing the grain flow and molecular structure produced by the improved method of forging;

Fig. 33, a similar section showing the spongy central lamination produced by the old method;

Fig. 34, a longitudinal sectional view through a bar blank which has been elongated by hammering;

Fig. 35, a similar view of a connecting rod which has been hammer forged in the dies under the old method, before the flash or fin is removed;

Fig. 36, a transverse sectional view on the line 36—36, Fig. 35;

Fig. 37, a longitudinal sectional view, on an enlarged scale, through the partly completed product shown in Fig. 25;

Fig. 38, a similar view through the connecting rod forging shown in Fig. 28; and Fig. 39, a section on the line 39—39, Fig. 38.

Similar numerals refer to similar parts throughout the several figures of the drawings.

The forging mill in which the roll forging operations are performed, includes a pair of housings 10 and 11 in which are journaled the upper and lower rolls 12 and 13, respectively, the necks of which may be geared together, as shown at 14.

A large gear 15 may be provided upon the neck of the lower roll and driven from any suitable source of power, as by a pinion 16, a fly wheel 17 being preferably mounted upon a shaft thereof.

As shown in Figs. 1 and 2, the rolls 12 and 13 are separated and each has fixed thereon an arcuate forging die 18 extending part way around the surface of the roll.

Each of these dies has therein a similar series of circumferential impressions, as indicated at 19 to 27 inclusive, through which the bar blank is successively passed to produce the various steps of the forging shown in Figs. 6 to 24, inclusive.

A rest plate 28 is provided between the housings and in front of the bite of the roll dies, and provided with a series of guide grooves 29 corresponding in number and position to the die impressions 19 to 27 inclusive.

The rolls are continuously rotating in the direction of the arrows shown in Fig. 2, and in carrying out the forging operations, a bar blank 30, which may be square as shown in Figs. 4 and 5, or of other cross sectional shape, is grasped by one end in the tongs 31, and slid forward in the first groove 29 at the right side of the rest plate until the lug 32 upon the tongs contacts with the stop flange 33 upon the rest plate. This bar blank is moved between the rolls when they are substantially in the position shown in Figs. 1 and 2.

As the rolls continue to rotate, the bar blank will be engaged by the impressions 19 of the dies, rolling the blank therewith out of the dies and giving it the general shape shown in Figs. 6 and 7, leaving the enlarged head portion 34, which is gripped in the tongs, and elongating and reducing in cross section the remaining portion 35 of the blank, as shown in Figs. 6 and 7.

The blank is then given a quarter turn and in like manner inserted into the die impressions 20, further elongating the same, forming the reduced shank 35 with the ball portion 36 near the end opposite to the head 34, as shown in Figs. 8, 9 and 10.

The partly completed product is then given another quarter turn, and again inserted between the dies being engaged by the die impressions 21, further elongating and reducing the shank portion, as shown at 35a in Figs. 11 and 12, the elongation of the shank moving the ball portion 36 further from the head 34, as shown in these figures.

The bar is given another quarter turn, always in the same direction, and inserted between the dies to be engaged by the impressions 22, further reducing and elongating the shank portion, as shown at 35b, rolling the bar to the shape shown in Figs. 13 and 14.

The partly completed product, as thus shown, is then given another quarter turn and passed through the die impressions 23, further elongating and reducing the shank portion, as shown at 35c in Figs. 15 and 16.

It will be noted that in each of these operations the shank portion is rolled to substantially a diamond shaped or oblong cross section, and it should be understood that each time the bar is passed through the die rolls, this diamond cross section is upright, as shown in the cross sectional figures, and the same is distorted in passing through the dies to a smaller diamond shape, the major axis of which is at right angles to its original major axis.

By giving the bar a quarter turn each time, the diamond cross section is always in the position shown in the cross sectional views when the same enters the die rolls.

The bar is then given the customary quarter turn, and passed through the die impressions 24, further elongating and reducing the shank portion, as shown at 35d in Figs. 17 and 18.

By successive passes through the die impressions 25, 26 and 27, with a quarter turn of the bar, as above described, the same is rolled to the forms shown in Figs. 19, 21 and 23 respectively, and in the cross sectional Figs. 20, 22 and 24 respectively, further elongating and reducing the shank portion, as shown at 35e, 35f and 35g respectively.

By successively rotating the bar a quarter turn before each rolling operation and reducing and elongating the same as above described, it will be seen that a straight grain flow is produced, as shown in Fig. 37, and the spongy central portion of the rod is confined and compressed entirely through the longitudinal center of the forging.

It will be seen that starting with the second rolling operation, as illustrated in Fig. 8, a slight neck 37 is formed on the ball portion 36, and this neck is increased in length and diminished in cross section with each rolling operation, forming a tong hold for the hammer forging operations which follow the rolling above described.

The neck 37, of the partly completed product shown in Fig. 23, is then gripped in a pair of tongs and the rolled forging is placed beneath a hammer, first flattening the head portion 34 to the shape shown at 34a in Figs. 25 and 26.

The ball portion is then hammer forged, in a suitable die, to a substantially spherical shape, as shown at 36a in Figs. 25 and 27, and the shank portion is at the same time hammer forged to a substantially square cross section, as shown at 35h in Figs. 25, 26 and 27.

The forging is then hammer forged in dies having substantially the impression desired in the finished connecting rod forging, into the shape shown in Figs. 28 and 29.

It will be seen that the elongated shank portion is forged to substantially an I-beam cross section, as shown at 35i in Figs. 28 and 29. The head is forged into the crank shaft bearing portion 34b and the ball portion is forged into the wrist pin bearing 36b.

The flash or fin 38, of less thickness and width than that produced by the old method, remains upon the forging and may be trimmed, while still hot, in any suitable trimming device, producing the finished connecting rod forging shown in Figs. 30 and 31.

If desired, after the fin has been removed, the finished forging may be again placed in a die having the finished shape and may be hammer forged without materially changing the shape of the forging.

It should be understood that the various steps of roll forging, shown in Figs. 4 to 24 inclusive, may all be accomplished with a single heating of the bar, but the partly finished product shown in Fig. 23 is preferably reheated before performing the hammer forging steps of the operation.

By producing the forging in the manner above described, the spongy central portion of the bar is entirely confined and compressed within the central portion of the finished forging, as indicated at 39 in Fig. 32.

This spongy central portion is entirely surrounded by the more compact or refined grain structure indicated at 40 in Fig. 32, thus producing a considerably stronger forging, and preventing any splitting at the sides thereof, as frequently happens with forgings made under the method now in general use.

As shown in Fig. 34, when the bar is elongated with the hammer by taking bites at different points, the grain flow is distorted and whirls are produced throughout the length of the bar.

Furthermore, in elongating the bar by this old method, it is impossible to accurately size the same and thus a considerable amount of flash or fin is produced when the bar is die forged to the finished shape as shown in Figs. 35 and 36.

It will also be obvious that the distortion of the grain flow is increased in the die forging operation and as shown in Figs. 35 and 36, the spongy central core 39a is curved back and forth throughout the length of the forging at points extending through the sides of the forging.

When the flash or fin is then trimmed off the cords of the grain are cut through in many places at each side of the forging and the spongy central portion is exposed, causing splits or cracks in the sides of the same, as indicated at 41 in Fig. 33.

By elongating the bar in the roll dies as herein described, the straight grain flow is maintained in the rolled blank, as shown in Fig. 37, and the bar blank may be rolled down more accurately to the necessary size, thus producing considerably less flash or fin when hammer forged in the dies, as shown in Figs. 38 and 39.

Furthermore, it will be seen that by elongating the bar in the rolls the ball portion 36a may be properly spaced from the head portion 34a so that when the rolled bar blank is placed in the dies for hammer forging, they are in proper position to cause no whirls or distortion of the grain flow at these points.

The spongy central core 39 is confined entirely to the central portion of the forged connecting rod as shown in Figs. 38 and 39 and the grain flow throughout the elongated shank is substantially straight.

Thus when the small amount of flash or fin formed by this method is trimmed off, the grain cords are not severed and the spongy central portion is not exposed through the sides of the forging.

From the above it will be seen that the improved method of forging gives a straight grain flow longitudinally of the forging and a uniform molecular structure throughout the section thereof, even where the same is afterward hammer forged in the impression of an I-beam section, and the spongy core is confined entirely within the central portion of the forging, preventing splitting at the sides and producing a much stronger forging, and one which will not fail from fatigue from vibration at the point of failure of forgings made under the old method.

I claim:—

1. The method of forging connecting rods and the like which consists in heating a bar blank, reducing the shank portion by successive passes between a series of roll dies, rolling a portion of the bar into diamond cross sectional shape with each pass, turning the bar a quarter turn between passes to elongate and reduce said diamond shaped portion leaving a head portion of original cross section at one end of the bar and forming a ball portion near the other end of the bar, and then hammer forging the partly completed product to finished form, the head portion forming the crank shaft bearing, the ball portion forming the wrist pin bearing and the intermediate shank portion being hammered to I-beam cross section.

2. The method of forging connecting rods and the like which consists in heating a bar blank, reducing the shank portion by successive passes between a series of roll dies, rolling a portion of the bar into diamond cross sectional shape with each pass, turning the bar a quarter turn between passes to elongate and reduce said diamond shaped portion leaving a head portion of original cross section at one end of the bar and forming a ball portion near the other end of the bar, reheating the partly completed product, and then hammer forging the partly completed product to finished form, the head portion forming the crank shaft bearing, the ball portion forming the wrist pin bearing and the intermediate shank portion being hammered to I-beam cross section.

3. The method of forging connecting rods and the like, which consists in heating a bar blank, reducing the shank portion by successive passes between a series of roll dies, rolling the shank portion of the bar into diamond cross sectional shape with each pass, turning the bar a quarter turn between passes to elongate and reduce said diamond shaped shank portion and to change the major axis thereof, leaving a head portion of original cross section at one end of the bar and forming a ball portion near the other end of the bar, and then hammer forging the partly completed product to finished form, the head portion forming the crank shaft bearing, the ball portion forming the wrist pin bearing and the intermediate shank portion being hammered to I-beam cross section.

4. The method of forging connecting rods and the like, which consists in heating a bar blank, reducing its shank portion by successive passes between a series of roll dies, rolling the shank portion of the bar into diamond cross sectional shape with each pass, turning the bar a quarter turn between passes to elongate and reduce said diamond shaped shank portion and to change the major axis thereof, leaving a head portion of original cross section at one end of the bar and forming a ball portion near the other end of the bar, reheating the partly completed product, and then hammer forging the partly completed product to finished form, the head portion forming the crank shaft bearing, the ball portion forming the wrist pin bearing and the intermediate shank portion being hammered to I-beam cross section.

5. The method of forging connecting rods and the like, which consists in heating a bar blank, reducing the shank portion by successive passes between a series of roll dies, rolling the shank portion of the bar into oblong cross sectional shape with each pass, turning the bar a quarter turn between passes to elongate and reduce said oblong shaped shank portion, leaving a head portion of original cross section at one end of the bar and forming a ball portion near the other end of the bar, and then hammer forging the partly completed product to finished form, the head portion forming the crank shaft bearing, the ball portion forming the wrist pin bearing and the intermediate shank portion being hammered to I-beam cross section.

6. The method of forging connecting rods and the like, which consists in heating a bar blank, reducing the shank portion by successive passes between a series of roll dies, rolling the shank portion of the bar into oblong cross sectional shape with each pass, turning the bar a quarter turn between passes to elongate and reduce said oblong shaped shank portion, leaving a head portion of original cross section at one end of the bar and forming a ball portion near the other end of the bar, reheating the partly completed product, and then hammer forging the partly completed product to finished form, the head portion forming the crank shaft bearing, the ball portion forming the wrist pin bearing and the intermediate shank portion being hammered to I-beam cross section.

7. The method of forging connecting rods and the like, which consists in heating a bar blank, reducing the blank portion by successive passes between a series of roll dies, rolling the shank portion of the bar into oblong cross sectional shape with each pass, turning the bar a quarter turn between passes to elongate and reduce said oblong shaped shank portion and to change the major axis thereof, leaving a head portion of original cross section at one end of the bar and forming a ball portion near the other end of the bar, and then hammer forging the partly completed product to finished form, the head portion forming the crank shaft bearing, the ball portion forming the wrist pin bearing and the intermediate shank portion being hammered to I-beam cross section.

8. The method of forging connecting rods and the like, which consists in heating a bar blank, reducing the shank portion by successive passes between a series of roll dies, rolling the shank portion of the bar into oblong cross sectional shape with each pass, turning the bar a quarter turn between passes to elongate and reduce said oblong shaped shank portion and to change the major axis thereof, leaving a head portion of original cross section at one end of the bar and forming a ball portion near the other end of the bar, reheating the partly completed product, and then hammer forging the partly completed product to finished form, the head portion forming the crank shaft bearing, the ball portion forming the wrist pin bearing and the intermediate shank portion being hammered to I-beam cross section.

9. The method of forging connecting rods and the like, which consists in heating a bar blank, successively passing the heated bar through a series of roll dies, turning the bar a quarter turn between passes, leaving a head portion of original cross section at one end of the bar, forming a ball portion near the other end of the bar, and elongating and reducing the cross section of the intermediate shank portion, and then hammer forging the partly completed product to finished form, the head portion forming the crank shaft bearing, the ball portion forming the wrist pin bearing and the intermediate shank portion being hammered to I-beam cross section.

10. The method of forging connecting rods and the like, which consists in heating a bar blank, successively passing the heated bar through a series of roll dies, turning the bar a quarter turn between passes, leaving a head portion of original cross section at one end of the bar, forming a ball portion near the other end of the bar, and elongating and reducing the cross section of the intermediate shank portion, reheating the partly completed product, and then hammer forging the partly completed product to finished form, the head portion forming the crank shaft bearing, the ball portion forming the wrist pin bearing and the intermediate shank portion being hammered to I-beam cross section.

11. The method of forging connecting rods and the like, which consists in heating a bar blank, successively passing the heated bar through a series of roll dies, turning the bar a quarter turn between passes, leaving a head portion of original cross section at one end of the bar, forming a ball portion near the other end of the bar, and elongating and reducing the cross section of the intermediate shank portion, then flattening the head portion and rounding the ball portion by hammer forging the partly completed product to finished form, the head portion forming the crank shaft bearing, the ball portion forming the wrist pin bearing and the intermediate shank portion being hammered to I-beam cross section.

12. The method of forging connecting rods and the like, which consists in heating a bar blank, successively passing the heated bar through a series of roll dies, turning the bar a quarter turn between passes, leaving a head portion of original cross section at one end of the bar, forming a ball portion near the other end of the bar, and elongating and reducing the cross section of the intermediate shank portion, reheating the partly completed product, then flattening the head portion and rounding the ball portion by hammer forging the partly completed product to finished form, the head portion forming the crank shaft bearing, the ball portion forming the wrist pin bearing and the intermediate shank portion being hammered to I-beam cross section.

13. The method of forging connecting rods and the like which consists in heating a bar blank, successively passing the heated bar through a series of roll dies, leaving a head portion of original cross section at one end of the bar, forming a ball portion near the other end of the bar, and elongating and reducing the cross section of the intermediate shank portion, and then hammer forging the partly completed product to finished form, the head portion forming the crank shaft bearing, the ball portion forming the wrist pin bearing and the intermediate shank portion being hammered to I-beam cross section.

14. The method of forging connecting rods and the like which consists in heating a bar blank, successively passing the heated bar through a series of roll dies, leaving a head portion of original cross section at one end of the bar, forming a ball portion near the other end of the bar, and elongating and reducing the cross section of the intermediate shank portion, reheating the partly completed product, and then hammer forging the partly completed product to finished form, the head portion forming the crank shaft bearing, the ball portion forming the wrist pin bearing and the intermediate shank portion being hammered to I-beam cross section.

15. The method of forging connecting rods and the like which consists in heating a bar blank, successively passing the heated bar through a series of roll dies, leaving a head portion of original cross section at one end of the bar, forming a ball portion near the other end of the bar, and elongating and reducing the cross section of the intermediate shank portion, then flattening the head portion and rounding the ball portion by hammer forging the partly completed product to finished form, the head portion forming the crank shaft bearing, the ball portion forming the wrist pin bearing and the intermediate shank portion being hammered to I-beam cross section.

16. The method of forging connecting rods and the like which consists in heating a bar blank, successively passing the heated bar through a series of roll dies, leaving a head portion of original cross section at one end of the bar, forming a ball portion near the other end of the bar, and elongating and reducing the cross section of the intermediate shank portion, reheating the partly completed product, then flattening the head portion and rounding the ball portion by hammer forging the partly completed product to finished form, the head portion forming the crank shaft bearing, the ball portion forming the wrist pin bearing and the intermediate shank portion being hammered to I-beam cross section.

In testimony that I claim the above, I have hereunto subscribed my name.

CHARLES A. BRAUCHLER.